United States Patent
Sangra et al.

(10) Patent No.: US 11,023,733 B2
(45) Date of Patent: Jun. 1, 2021

(54) SYSTEM AND METHOD FOR ANALYZING A VIDEO FILE IN A SHORTENED TIME FRAME

(71) Applicants: Nagender Sangra, Haryana (IN); Saurabh Singh, Mumbai (IN); Rahul Jain, Mumbai (IN)

(72) Inventors: Nagender Sangra, Haryana (IN); Saurabh Singh, Mumbai (IN); Rahul Jain, Mumbai (IN)

(73) Assignee: Flickstree Productions Pvt Ltd, Mumbai (IN)

( * ) Notice: Subject to any disclaimer, the term of this patent is extended or adjusted under 35 U.S.C. 154(b) by 0 days.

(21) Appl. No.: 16/739,657

(22) Filed: Jan. 10, 2020

(65) Prior Publication Data

US 2020/0151455 A1    May 14, 2020

Related U.S. Application Data

(63) Continuation of application No. PCT/IN2018/050449, filed on Jul. 10, 2018.

(30) Foreign Application Priority Data

Jul. 10, 2017   (IN) .............................. 201721024227

(51) Int. Cl.
G06K 9/00      (2006.01)
G11B 27/19     (2006.01)
(Continued)

(52) U.S. Cl.
CPC ..... G06K 9/00718 (2013.01); G06K 9/00744 (2013.01); G06K 9/00765 (2013.01);
(Continued)

(58) Field of Classification Search
CPC .......................... G06K 9/00718; G10L 13/00
See application file for complete search history.

(56) References Cited

U.S. PATENT DOCUMENTS 10,304,458 B1 *  5/2019  Woo ................... H04N 21/4884
2001/0020954 A1 *  9/2001  Hull ....................... H04L 65/403
                                                                  715/730

(Continued)

OTHER PUBLICATIONS

WIPO, International Search Report in corresponding PCT application PCT/IN2018/050449, dated Aug. 8, 2018.

(Continued)

*Primary Examiner* — Girumsew Wendmagegn
(74) *Attorney, Agent, or Firm* — Ryan Alley IP

(57) ABSTRACT

A system for analyzing a video file in a shortened time frame, said system comprising: a receiver (VFR) to receive a video file (VF) as an input; a Time Splitter (TR) to split the received video file according to set intervals of time depending on how fast said video is to be analyzed; a Frame splitter (FP) to split a Video Viewing Program (R) into a plurality of frames (F1, F2, . . . Fn); a Key Frame Identification mechanism (KFI) to identify key frames; and linking mechanism (LM) to cause a link to be formed with pre-populated databases and in-house libraries of images (D), of frames, which frames comprising associated tags, thereby determining a score of similar tags per video file in order to determine said genre, thereby determining multiplicity of instances for said time splitter.

11 Claims, 1 Drawing Sheet

(51) Int. Cl.
*G11B 27/34* (2006.01)
*G10L 13/00* (2006.01)
(52) U.S. Cl.
CPC .............. *G10L 13/00* (2013.01); *G11B 27/19* (2013.01); *G11B 27/34* (2013.01)

(56) References Cited

U.S. PATENT DOCUMENTS

| | | | | |
|---|---|---|---|---|
| 2002/0159750 | A1* | 10/2002 | Jasinschi | G06K 9/00711 386/241 |
| 2003/0208755 | A1* | 11/2003 | Zimmerman | H04N 5/44543 725/34 |
| 2005/0033758 | A1* | 2/2005 | Baxter | G11B 27/28 |
| 2005/0228849 | A1* | 10/2005 | Zhang | G06F 16/739 709/200 |
| 2012/0170648 | A1 | 7/2012 | Chen et al. | |
| 2017/0329490 | A1* | 11/2017 | Esinovskaya | G06F 16/93 |

OTHER PUBLICATIONS

WIPO, Written Opinion of the ISA in corresponding PCT application PCT/IN2018/050449, dated Aug. 8, 2018.
Hosseini et al,, "Deceiving Google's Cloud Video Intelligence API Built for Summarizing Videos," Mar. 26, 2017, arXiv preprint.

* cited by examiner

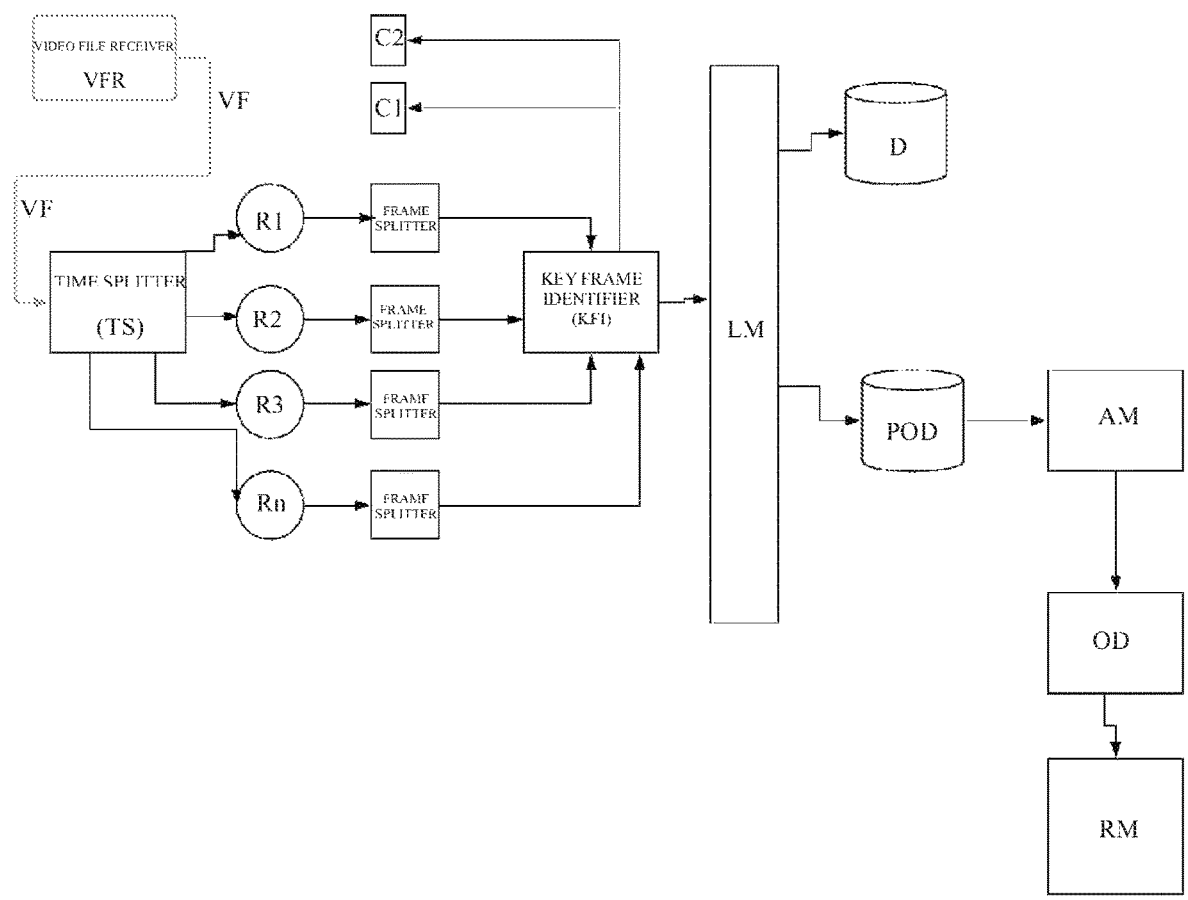

SYSTEM AND METHOD FOR ANALYZING A VIDEO FILE IN A SHORTENED TIME FRAME

RELATED APPLICATIONS

This application claims priority under 35 U.S.C. § 120 to, and is a continuation of, co-pending International Application PCT/IN2018/050449, filed Jul. 10, 2018 and designating the US, which claims priority to Indian Application 201721024227, filed Jul. 10, 2017, such IN Application also being claimed priority to under 35 U.S.C. § 119. These IN and International applications are incorporated by reference herein in their entireties.

BACKGROUND

Field

This invention relates to the field of multimedia technology.

Particularly, this invention relates to a system and method for analyzing a video file in a shortened time frame.

Currently, tagging of videos—be it the title, genre, sub-genre, or other tags are all done by a content uploader or a user or a content producer. While watching these videos, video platforms rely on these tags to offer viewing decisions (search, recommendations, and the like).

Often, these tags are misleading, exaggerated, or even false as it is done for the purpose of boosting video indexing and discoverability on search engines. These are tactics done by the content uploader. This also leads to ineffective video genres and video category being listed by the uploader. These, further, lead to ineffective user experience, as users might end up wasting time and data in watching content that is not as per their liking.

There is no technology that understands or interprets what the video is about and which comes up with accurate video genre or video context.

False meta-tagging, therefore, is a problem area. There is a need for a system and method which correctly tags or meta-tags any video without relying on the content uploader. For this, there is also a need also for a system and method which analyses video content in an automated manner. Further, there is also a need for a system and method which analyses video content in time duration that is relatively and substantially smaller than the actual runtime of the video content that is to be analyzed.

The prior art consists of identifying "video labels", i.e. key objects within each video. However, these video labels are independent and together do not create any context for a given video. There is no prior art system or method that involves watching a video and identifying the video category or its genre.

Additionally, prior art exists, in that, systems and methods exist wherein video labeling is done after watching a video with full run time. This is an inefficient and cumbersome process.

Therefore, there is a need for a system and method which analyses a given video content in a time frame which is substantially lesser than the full runtime of the video.

SUMMARY

An object of the invention is to provide a system and method which correctly tags, meta-tags, and indexes any video file without relying on a content uploader.

Another object of the invention is to provide a system and method which automatically correctly tags, meta-tags, and indexes any video file without relying on a content uploader.

Yet another object of the invention is to provide a system and method which analyses a given video file in a time frame which is substantially lesser than the actual/full runtime of the video file.

Still another object of the invention is to provide a system and method which provides a scalable solution towards analyzing a video file.

An additional object of the invention is to provide a system and method which provides a precise solution towards analyzing a video file.

Another additional object of the invention is to provide a system and method with relatively improved user-experience in terms of dissecting a video file by video category.

Another additional object of the invention is to provide a system and method with relatively improved user-experience in terms of dissecting a video file by video genre.

Yet another additional object of the invention is to provide a system and method which enables a video file to be searched with ease and with correct relevance.

According to this invention, there is provided a system for analyzing a video file in a shortened time frame, the system comprises:
- a receiver to receive a video file as an input;
- a Time Splitter to split the received video file according to set intervals of time depending on how fast the video is to be analysed, the time splitter configured to split the video into multiple instances of Video Viewing Programs, dynamically, the multiplicity of instances defining speed of analysis of a video file;
- a Frame splitter to split each Video Viewing Program into a plurality of frames, the number of frames per video file being determined by genre of the video, the genre correlative to number of tags per video file;
- a Key Frame Identification mechanism to identify key frames from the frame splitter based on pre-defined data items from the key frames; and
- linking mechanism to cause a link to be formed with pre-populated databases and in-house libraries of images, of frames, which frames comprising associated tags, thereby determining a score of similar tags per video file in order to determine the genre, thereby determining multiplicity of instances for the time splitter.

In at least an embodiment, the Key Frame Identification mechanism comprises a host of comparators to compare for similarity in frames that are a part of the frame splitter.

In at least an embodiment, the Key Frame Identification mechanism is configured to identify each frame with a relevancy score based on multiple parameters.

In at least an embodiment, the Key Frame Identification mechanism is configured to identify each frame with a relevancy score based on multiple parameters, characterised in that, an extracted frame of a video viewing program is scanned to recognize at least one of the following three data items:
- Living object
- Non-living object
- Labels In at least an embodiment, the Key Frame Identification mechanism comprises a host of comparators to compare for similarity in frames that are a part of the frame splitter, characterised in that, the comparator being employed to check each frame with its successor frame and its predecessor frame in terms of defined data items to check for rate of change of data items per frame.

In at least an embodiment, the Key Frame Identification mechanism comprises a host of comparators to compare for similarity in frames that are a part of the frame splitter, characterised in that, a subsequent score being assigned to each frame and frames with higher scores or scores within a pre-determined score band being tagged as identified key frames per video viewing program.

In at least an embodiment, the Key Frame Identification mechanism comprises a host of comparators to compare for similarity in frames that are a part of the frame splitter, characterised in that, a score being assigned to each frame, the score being compared against all frames available within the video and system configured to look for similar scores and tagged images, wherein key frames being conclusively defined for each video based on pre-defined delta (change) ranges.

In at least an embodiment, the system comprises an analysis mechanism is configured to use supervised and unsupervised reinforcement learning mechanisms to read and analyse data items in order to create a context for the video file in order to obtain, as output, at least a video category data items and/or at least a video genre data item, characterised in that, a weighted score being given to all the identified data items and tags depending of degree of separation and degree of association.

In at least an embodiment, the system comprises an analysis mechanism using multiple linear regressions with different variables in order to obtain, as output, a context data item per video file.

In at least an embodiment, the system comprises a user's profile history comprising tags (scored or unscored) based on past viewing patterns to provide user-specific video recommendations.

In at least an embodiment, the system comprises a recommendation mechanism configured to use decision trees along with a relevance factor to provide recommendations of additional video files that may be context-relevant to the input video file.

In at least an embodiment, the system comprises:
an audio extractor to extract audio from an input video file;
a text to speech converter employed to transcribe text of the audio; and
linking mechanism to associate the text portion with a tag based on correlation between transcribed text and vide tags to provide a reinforced tag to the video file.

According to this invention, there is also provided a method for analyzing a video file in a shortened time frame, the method comprises the steps of:
receiving a video file as an input;
splitting the received video file according to set intervals of time depending on how fast the video is to be analysed, the video file being split into multiple instances of Video Viewing Programs, dynamically, the multiplicity of instances defining speed of analysis of a video file;
splitting each Video Viewing Program into a plurality of frames, the number of frames per video file being determined by genre of the video, the genre correlative to number of tags per video file;
identifying key frames from the frame splitter based on pre-defined data items from the key frames; and
causing a link to be formed with pre-populated databases and in-house libraries of images, of frames, which frames comprising associated tags, thereby determining a score of similar tags per video file in order to determine the genre, thereby determining multiplicity of instances for the time splitter.

BRIEF DESCRIPTION OF THE ACCOMPANYING DRAWINGS

The invention will now be described in relation to the accompanying drawings, in which:

FIG. 1 illustrates a schematic block diagram of the system of this invention.

DETAILED DESCRIPTION

According to this invention, there is provided a system and method for analyzing a video file in a shortened time frame.

FIG. 1 illustrates a schematic block diagram of the system of this invention. In accordance with an embodiment of this invention, there is provided a receiver (VFR) in order to receive a video file (VF) as an input.

In accordance with another embodiment of this invention, there is provided a Time Splitter (TR) in order to receive a video file (VF) as an input. A video file format is a type of file format for storing digital video data on a computer system. Video is almost always stored in compressed form to reduce file size. A video file normally consists of a container containing video data in a video coding format (e.g. VP9) alongside audio data in an audio coding format (e.g. Opus). The container can also contain synchronization information, subtitles, and metadata such as title. A standardized video file type such as .webm is a profile specified by a restriction on which container format and which video and audio compression formats are allowed. A program (or hardware) which can decode video or audio is called a codec; playing or encoding a video file sometimes require the user to install a codec library corresponding to the type of video and audio coding used in the file. Some examples of video file formats are: WebM (.webm), Windows Media Video (.wmv), and Ogg Video (.ogv), each of which can only contain a few well-defined subtypes of video and audio coding formats. This video file container is also capable of reading any prior meta-data that is associated with that video (if available); for example, the genre of the video, title etc.

This Time Splitter (TR) is configured to receive all kinds of video file formats from the receiver. At this stage, the system and method, of this invention, splits the video file according to set intervals of time depending on how fast the video is to be analysed. The time splitter splits the video and creates multiple instances of Video Viewing Programs (R1, R2 . . . Rn), dynamically. Dynamicity is a function of resource allocation. In other words, depending on computing power available or computing power required, instances of video viewing programs are created.

In at least a non-limiting exemplary embodiment, if the system and method of this invention is configured to analyze an input vide file of one hour video in 10 mins, the Time Splitter creates 6 instances of R and will break the video in 6 equal parts of 10 min each and it is distributed to 6 instances of R (R1 to R6). T0-T10, T11 to T20, T21 to T30, T31 to T40, T41 to T50, and T51 to T60 is sent to R1, R2, R3, R4, R5, and R6 instances of Video Viewing program, correspondingly.

In at least a non-limiting exemplary embodiment, if the system and method of this invention is configured to analyze an input vide file of one hour video in 5 mins, the Time Splitter creates 12 instances of Video viewing program dynamically and video is split into 12 equal parts of 5 min each and it is distributed to 12 instances of R (R1 to R12). T0-T5, T6-T10, T11-T15, T16-T20, T21-T25, T26-T30, T31-T35, T36-T40, T41-T45, T46-T50, T51-T55, T56-T60 is sent to R1, R2, R3, R4, R5, R6, R7, R8, R9, R10, R11, and R12 instances of Video Viewing program, correspondingly.

The configuration of Video Viewing Program is controlled by an administrator and depending on requirements, limits are set. If no limit is set, it is set to a default value of 1 min.

This video file needs to be analysed using the system and method of this invention. Temporary and permanent caches may, advantageously, be used in accordance with this Time splitter in order to store this file for pre-determined periods of time along with keeping copies of the original file, as and required by the system and method of this invention.

In accordance with another embodiment of this invention, there is provided a Frame splitter (FP) configured to split each input or received video file of Video viewing program (R) into a plurality of frames (F1, F2, . . . Fn). It is known that any given video file is a sequence of a plurality of image files. The Frame splitter, essentially, splits the video file into its constituent image files. Temporary and permanent caches may, advantageously, be used in accordance with this receiver in order to store these files for pre-determined periods of time along with keeping copies of the original files, as and required by the system and method of this invention.

Depending on the meta-data (if available) from the video file (VF), the system and method, on the basis of supervised learning, decides the time frame interval in which the video needs to be split into frames. In at least a non-limiting exemplary embodiment, if the known genre of video is sports, the system and method of this invention splits the video into less than 1 frame/sec while for a funny video, the system and method of this invention splits it as 1 frame/5 sec. Default value is set to be 1 frame per 10 sec if no prior meta-data is available.

In accordance with yet another embodiment of this invention, a Key Frame Identification mechanism (KFI) is used to find out the strategic frames and remove the duplicates/similar frames from the Frame Splitter. At this stage, frames gathered from multiple Frame Splitters are also analyzed together and checked for similarity and duplicacy. Only unique frames are identified at this stage. In at least a non-limiting exemplary embodiment, in the case of nature videos, the system receives many frames containing same elements such as rivers, hills, trees. In this case, the system and method of this invention chooses the most suitable frames and uses that only for analysis. In accordance with still another embodiment of this invention, a host of comparators (C1, C2, . . . , Cn) compares for similarity in images that are a part of the frame splitter.

The key frame identification mechanism is configured to identify each frame with a relevancy score based on multiple parameters. In at least an embodiment, an extracted frame of a video viewing program is scanned to recognize at least one of the following three data items:

Living object;

Non-living object;

Labels.

Further, a living object may further be classified as a recognized living object or a non-recognized living object. Additionally, labels may comprise colours, brands, patterns and the like. Known scanning techniques in correlation with pre-populated databases/libraries are used in order to determine presence of at least one of the data items in order to identify a key image. A subsequent score is assigned to each frame and frames with higher scores or scores within a pre-determined score band are tagged as identified key frames per video viewing program.

Once a video is split into multiple frames, the system and method of this invention first tries to find similar frames and segregate distinct frames that are available. Two frames that are to be compared are resized so that they have substantially equal dimensions, filters (of imaging) are applied to them to obtain frames that are then used by the comparator.

In at least a non-limiting exemplary embodiment, the filter applied is a greyscale filter t which converts an image into greyscale by changing the red, green, and blue components to their weighted sum using the same coefficients as the REC.601 luma (Y') calculation. The alpha components are retained. Then, colour mean value of each image, is computed, which is a mean value of the colors and the list of all pixels' colours. Then, the system and method obtains bits of the colour mean which returns an array with 1s and 0s. If a colour is bigger than the mean value of colors, it is 1. After bits of each image are obtained, the system and method calculates the Hammering Distance between the two. The hammering distance between two objects is the number of positions at which the corresponding bits are different. In this way, the system and method eliminates similar frames and move to the next step of identifying strategic frames.

Based on unsupervised machine learning, depending upon the video genre, a relative score is given to each frame based on living tagged objects, non-living tagged objects- and labels; up to 5 decimal points.

This score is then compared against all frames available within the video and the system and method looks for similar scores and tagged images. Frames that have delta (change) in the range between 0.5-1 are taken and below 0.5 are discarded. This delta is system-defined and can be defined per genre. The objective of this exercise is to get completely distinct frames that optimizes accurate context creation for each video.

Once n number of frames—f(n)—are available that are distinct, labels and objects of f(1), f(2), . . . . f(n) are then studied for further context creation.

A Set "C" of well defined distinct objects is then created by combing all objects and Tags. In at least a non-limiting exemplary embodiment, a zoo video has monkey (m), giraffe (g), lion (l) and elephant (e) along with objects like cage, vegetation, water bodies, etc. The animal set created would be C={m, g, l, e}

Density based clustering algorithm then identifies what % age of time each animal appears within the video. A final set is then created based on C={x:x∈N and x>=5%}. There is no limit to number of elements in C, η(C).

In absence of a well dominant element>=5%, C becomes a null set, where C=φ

In at least an embodiment, a comparator is employed which check each frame with its successor frame and its predecessor frame in terms of the defined data items to check for rate of change of data items per frame. This aids in determination of genre of video. Thus, rate of analysis (i.e. number of video viewing programs) is determined based on the identification of genre as determined by the comparator. The determination of genre is important in order to allocate computing resources. In at least a non-limiting exemplary embodiment, the rate of change of data items per frame is far less for a stand-up comedian video than that of a football match video. Furthermore, rate of change of data items in identified key frames is important to identify data items in the video. The comparator is, therefore, configured to determined bands per genre, which bands correlate with rate of change of data items per video.

In accordance with yet another embodiment of this invention, a linking mechanism (LM) causes a link to be formed with pre-populated databases and in-house libraries of images (D), of image files/frames, which image files/frames comprise associated tags, meta-tags, and indices through supervised learning techniques. The linking mechanism, for the time duration of analysis of a given video frame, causes a link to be formed between the key frames that are identified that are to be analysed with the databases. Further, the linking mechanism, causes an output to be served, which output is a tag from the databases associated with the key frame that is analysed. In at least a non-limiting exemplary embodiment, in a sports video having Maradona playing soccer in a match, the linking mechanism (LM) identifies Maradona from a library of celebrities, it then identifies football from a library of objects, and then identifies a playground from a general objects library; thus, creating a link of a celebrity (Mardona) playing sports (soccer) in a location (ground).

Since each video file has a set of key frames, the tags associated with it are used to compute a percentage score. In other words, the percentage of occurrence of a specific tag per set of key frames determines ranks of the tag per video, thereby defining or re-defining its genre. The percentage of repetition of a tag (number of tags) is a function (correlative) of repetition of identified data items, of the scoring parameters, per key frame.

All the fetched tags, meta-tags, indices are stored in a pre-output database (POD) in association with the image files and also in association with the portions of the video file(s) that were analyzed.

In accordance with still another embodiment of this invention, an analysis mechanism (AM) configured to use supervised and unsupervised reinforcement learning mechanisms are used to read and analyse data items from the pre-output database in order to create a context for the video file that is being analysed in order to obtain, as output, at least a video category data items and/or at least a video genre data item. A weighted score is given to all the identified objects and tags depending of degree of separation and degree of association techniques. In at least a non-limiting exemplary embodiment, with respect to the above-stated example, of all the objects Maradona (celebrity) gets highest score because of celebrity status and soccer (sports) gets the next high score because of type of sport and all other tags like ground, people, etc. get average scores. Here again, large datasets of unsupervised learning datasets are used.

Furthermore, this analysis mechanism uses multiple linear regressions with different variables in order to obtain, as output, a context data item. In at least a non-limiting exemplary embodiment, with respect to the above-stated example, the context that is determined is "A famous player Maradona playing soccer in a match" and also the analysis mechanism (AM) identifies this video as a sports video under Soccer category. This context data items is stored in an output database (OD) along with video category data item and video genre data item.

In at least an embodiment, a user's profile history, which may also comprise tags (scored or unscored) based on past viewing patterns is used to provide user-specific video recommendations.

Thus, in at least one embodiment, a context statement of the video is delivered as an output to a user.

Additionally, in at least an embodiment, a recommendation mechanism (RCM) is configured to use decision trees along with a relevance factor to provide recommendations of additional video files that may be context-relevant to the input/received input video file. In other words, the recommendation mechanism uses decision tree to recommend videos with independent variables of multiple video tags, with if-else method to retain or discard these tags. Recommendation mechanism (RCM) recommends the above video to all those subjects which have either Maradona or soccer or sports in their profile in decreasing order of their weights. Moreover, recommendation mechanism (RCM) takes the subject feedback and response to further update the subject's profile.

K-nearest neighbors algorithm (KNN) is used to open social recommendations and thus build further context. KNN is also used to recommend this video to those subjects who do not have Maradona in their profile but are fond of watching soccer videos.

In at least an embodiment, an audio extractor is configured to extract audio from the video file. A text to speech converter is employed to transcribe the text of the audio. Frames of the video are time stamped. The audio of the video is also time stamped. The text of the audio of the video is also time stamped. The, frames, the audio, and its text can all be used, correlatively, to provide a reinforced tag to the video file. The text that is transcribed from the audio is also used with the linking mechanism (LM) to associate the text portion with a tag stored in databases.

Since each audio file has a set of tags associated with it, they are used to compute a percentage score. In other words, the percentage of occurrence of a specific tag per audio file, video file, further determines ranks of the tag per video, thereby defining or re-defining its genre and/or providing a reinforced tag to the video file. In at least an embodiment, a multiplication factor may be added for each defined tag done by video analysis upon its confirmation or match providing as an output of the audio file associated with that video.

The TECHNICAL ADVANTAGE of this invention lies in providing a system and method which accurately analyzes a video file, or its portions, in terms or genres and/or category. The TECHNICAL ADVANTAGE of this invention, specifically, lies in providing indexed framing of video files for faster analysis. Additionally, the TECHNICAL ADVANTANGE of this invention lies in analyzing a video file in a fraction of the actual/original video runtime. Therefore, this system and method allows for automated and precise tagging and/or indexing of any video file in a time that is faster than the actual runtime of the video file.

The invention claimed is:

1. A system for analyzing a video file in a shortened time frame, the system comprising:
   a receiver configured to receive a video file as an input;
   a time splitter configured to split the received video file according to set intervals of time depending on a speed of analysis of the video file and to dynamically split the video into a number of video viewing programs, wherein the number defines the speed of analysis of the video file;
   a frame splitter configured to split each of the video viewing programs into a plurality of frames determined by a genre of the video file, wherein the genre correlates to tags of the video file;
   a key frame identifier configured to identify key frames from the frame splitter based on pre-defined data items from the frames, wherein the key frame identifier includes comparators configured to determine similarity among the plurality of frames, wherein the comparators are configured to compare the score against all frames available within the video file and libraries and to look for similar scores and tagged images, and wherein the key frame identifier is configured to define key frames for each video file based on change ranges between the score and similar scores; and a link between pre-populated databases and libraries of image frames, wherein the image frames include tags that set a score for similar tags for the video file, wherein the genre is determined by the score.

2. The system of claim 1, wherein the similarity is determined by comparing sequential frames to determine a rate of change of data items per frame.

3. The system of claim 1, wherein the comparators are configured to assign a subsequent score to each frame, and frames with higher scores or scores within a score band are identified key frames in the video file.

4. The system of claim 1, wherein the key frame identifier is configured to identify each of the frames with a relevancy score based on multiple parameters.

5. The system of claim 4, wherein the multiple parameters include at least one of recognized living objects, non-living objects, and labels in the video file.

6. The system of claim 1, further comprising:
an analyzer configured to use supervised and unsupervised reinforcement learning mechanisms to read and analyze data items to create a context for the video file and to obtain, as output, video category data items and/or a video genre data item, and to assign a weighted score to all the data items and tags depending of a degree of separation and a degree of association.

7. The system of claim 1, further comprising:
a user profile history including unscored tags and scored tags based on past viewing patterns to provide user-specific video recommendations.

8. The system of claim 1, further comprising:
a recommender configured to use decision trees along with a relevance factor to provide recommendations of additional video files that may be context-relevant to the video file.

9. The system of claim 1, further comprising:
an audio extractor configured to extract audio from the video file;
a text-to-speech converter configured to transcribe text of the audio; and
a link that associates the text with a tag based on correlation between the text and video tags to provide a reinforced tag for the video file.

10. A method for analyzing a video file in a shortened time frame, the method comprising:
receiving a video file as an input;
splitting the received video file according to set intervals of time depending on a speed of analysis of the video file and dynamically splitting the video into a number of video viewing programs, wherein the number defines the speed of analysis of the video file;
splitting each of the video viewing programs into a plurality of frames determined by a genre of the video file, wherein the genre correlates to tags of the video file;
identifying key frames from the frame splitter based on pre-defined data items from the frames, wherein the identifying uses comparators to determine similarity among the plurality of frames, wherein the comparators are configured to compare the score against all frames available within the video file and libraries and to look for similar scores and tagged images, and wherein the identifying defines key frames for each video file based on change ranges between the score and similar scores; and
linking pre-populated databases and libraries of image frames, wherein the image frames include tags that set a score for similar tags for the video file, wherein the genre is determined by the score.

11. A system for analyzing a video file in a shortened time frame, the system comprising:
a receiver configured to receive a video file as an input;
a time splitter configured to split the received video file according to set intervals of time depending on a speed of analysis of the video file and to dynamically split the video into a number of video viewing programs, wherein the number defines the speed of analysis of the video file;
a frame splitter configured to split each of the video viewing programs into a plurality of frames determined by a genre of the video file, wherein the genre correlates to tags of the video file;
a key frame identifier configured to identify key frames from the frame splitter based on pre-defined data items from the frames;
a link between pre-populated databases and libraries of image frames, wherein the image frames include tags that set a score for similar tags for the video file, wherein the genre is determined by the score; and
an analyzer configured to use multiple linear regressions with different variables to obtain, as output, a context data item for the video file.

* * * * *